US006775696B1

(12) United States Patent
Hansen

(10) Patent No.: US 6,775,696 B1
(45) Date of Patent: Aug. 10, 2004

(54) SYSTEMS AND METHODS FOR COLLECTING AND PROVIDING CALL TRAFFIC INFORMATION TO END-USERS

(75) Inventor: Frederick W. Hansen, Sandy, UT (US)

(73) Assignee: Urisys Corporation, Blue Bell, PA (US)

( * ) Notice: Subject to any disclaimer, the term of this patent is extended or adjusted under 35 U.S.C. 154(b) by 0 days.

(21) Appl. No.: 09/533,464

(22) Filed: Mar. 23, 2000

(51) Int. Cl.⁷ .............................................. G06F 15/16
(52) U.S. Cl. ...................... 709/219; 709/206; 709/217; 709/224; 455/426.1; 455/432.2; 455/412.2
(58) Field of Search ................................ 709/200–203, 709/206–207, 217–219, 223–224, 245–246; 455/412–419, 445, 461–463, 426.1, 432.1–432.3, 435.1–435.3, 412.1–412.2; 370/351–353; 379/201.01, 265.03, 265.11

(56) References Cited

U.S. PATENT DOCUMENTS

| | | | |
|---|---|---|---|
| 3,231,866 A | 1/1966 | Goetz et al. ............. 340/172.5 |
| 4,399,332 A | 8/1983 | Furlan et al. ............. 174/101.5 |
| 4,525,601 A | 6/1985 | Barnich et al. ......... 179/7 MM |
| 4,723,270 A | 2/1988 | Okamoto et al. ........... 379/113 |
| 5,008,929 A | 4/1991 | Olsen et al. ................. 379/112 |
| 5,291,543 A | 3/1994 | Freese et al. .................. 379/59 |
| 5,410,589 A | 4/1995 | Galligan ...................... 379/134 |
| 5,517,549 A | 5/1996 | Lee .............................. 379/58 |
| 5,606,600 A | 2/1997 | Elliott et al. ................. 379/112 |
| 5,623,540 A | 4/1997 | Morrison et al. ........... 379/115 |
| 5,652,791 A | * 7/1997 | Sunderman et al. ... 379/265.03 |
| 5,673,306 A | 9/1997 | Amadon et al. ............... 379/59 |
| 5,675,507 A | * 10/1997 | Bobo, II ..................... 709/206 |
| 5,708,697 A | 1/1998 | Fischer et al. ................ 379/67 |
| 5,742,905 A | * 4/1998 | Pepe et al. .................. 455/461 |
| 5,749,052 A | 5/1998 | Hidem et al. ............... 455/406 |
| 5,815,556 A | 9/1998 | Thuresson et al. ........ 379/93.25 |
| 5,854,834 A | 12/1998 | Gottlieb et al. ............. 379/113 |
| 5,873,030 A | 2/1999 | Mechling et al. ........... 455/408 |
| 5,905,736 A | 5/1999 | Ronen et al. ................ 370/546 |
| 5,915,006 A | 6/1999 | Jagadish et al. ............ 379/127 |
| 5,928,325 A | * 7/1999 | Shaughnessy et al. ...... 709/206 |
| 6,108,537 A | * 8/2000 | Comer et al. ............. 455/426.1 |
| 6,212,550 B1 | * 4/2001 | Segur .......................... 709/206 |
| 6,226,287 B1 | * 5/2001 | Brady ..................... 379/265.11 |
| 6,279,037 B1 | * 8/2001 | Tams et al. .................. 709/224 |

FOREIGN PATENT DOCUMENTS

EP 41262 12/1981

OTHER PUBLICATIONS

Ahmari et al., "Helping switches to account for themselves," *Record*, 1985, 16–22 AT&T Bell Labs.

Moor, Herb, et al., "From cameras and registers to real–time traffic data," *Telephony*, 1983, 52, 57, and 60.

van Halen, R., et al., "A telephone traffic measuring system," *Phillips Telecommun. Rev.*, 1975, 33(4), 204–210.

\* cited by examiner

*Primary Examiner*—Bharat Barot
(74) *Attorney, Agent, or Firm*—Lise A. Rode; Mark T. Starr; WoodcockWashburn LLP

(57) ABSTRACT

The present invention provides a device for providing communication data to an end-user. The device comprises a storage unit coupled to a transmitter. The storage unit collects the end-user's communication data from a plurality of sources. The data may be transmitted to the storage unit by the sources using either wired or wireless techniques. The transmitter sends the communication data to the end-user. The device may further comprise a converter coupled to the storage unit. The converter translates the communication data into a format useable by the end-user. The communication data may be transmitted to the end-user using either wired or wireless transmission techniques. The data sent to the end-user includes completed communications as well as those attempted but not completed.

27 Claims, 5 Drawing Sheets

501: N 002 00 4999 A0000009 7.1.02.1    06/3/99 10:26 00:00:20    8288144

502: I 002 00 4999 0000018 7.1.02.1    06/3/99 13:18 00:18:28    801 555 5555    John Doe

Figure 5

SYSTEMS AND METHODS FOR COLLECTING AND PROVIDING CALL TRAFFIC INFORMATION TO END-USERS

FIELD OF THE INVENTION

The present invention generally relates to gathering and subsequently transmitting network communication data to an end-user. More particularly, the present invention relates to providing a record of network communications made to and from an end-user.

BACKGROUND OF THE INVENTION

Although network communication providers process all network communication data, only a portion of the entire available data is used, and for limited purposes. Network communication providers offer their end-user clients call traffic information only for billable communication from a voice-based source (e.g., long-distance telephone communications). This data often includes call start and end time, duration of the call, incoming caller name and telephone number, and outgoing called number. In addition to end-user purposes, network providers often collect some of the available data for their own purposes to diagnose system problems or to monitor system activity.

To date, however, network providers have not provided other segments of available data to their end-user clients in order to detail all communication activity sent to and received by the end-user. Thus, while network providers often supply an end-user with a detailed record of communications from voice-based telephony sources initiated by the end-user, other activities go unaccounted. For example, information regarding time spent listening to voice messages, receiving fax transmissions, or attending "Web meetings" are not provided to the end-user. Yet, information regarding these other communication activities is important to an accurate account of time management or time verification functions. Moreover, network providers already process the network data associated with these activities.

It would thus be advantageous to collect and provide to end-users data for all communications made to and from them. It would be further advantageous to provide this data in a format most useful to the end-users.

SUMMARY OF THE INVENTION

The present invention provides a device for providing communications data to an end-user. The device comprises a storage unit coupled to a transmitter. The storage unit collects the end-user's data from a plurality of sources. The data may be transmitted to the storage unit by the sources using either wired or wireless techniques. The transmitter sends the communications data to the end-user. The system may further comprise a converter coupled to the storage unit. The converter translates the communications data into a format useable by the end-user. The data may be transmitted to the end-user using either wired or wireless transmission techniques. The data sent to the end-user includes completed communications as well as those attempted but not completed.

According to another aspect of the invention, a data retrieval system is provided that automatically provides time management reports to a plurality of end-users. Each time management report comprises information about communications made to and from a particular end-user. The information is gathered from a plurality of sources and may include data sufficient to identify, for each communication involving a particular end-user, communication start time, communication end time, duration of communication, originator's identification, receiver's identification, and communication type. The information may further comprise the content of the communication and any data entered by the end-user. The end-user entered data may be entered during or after the communication to which it relates. The plurality of sources may include the following: central office messaging system, central office switch, wireless switch, fax server, paging server, short message server, radio transmission, e-mail server, Internet server, and Internet Relay Chat (IRC) server.

Other features of the present invention are described below.

BRIEF DESCRIPTION OF THE DRAWINGS

The network data messaging system providing communications data to an end-user in accordance with the present invention is further described with reference to the accompanying drawings in which:

FIG. 5 is an exemplary illustration of communication provided by available communications sources.

DETAILED DESCRIPTION OF PREFFERED EMBODIMENTS

Figure 1:
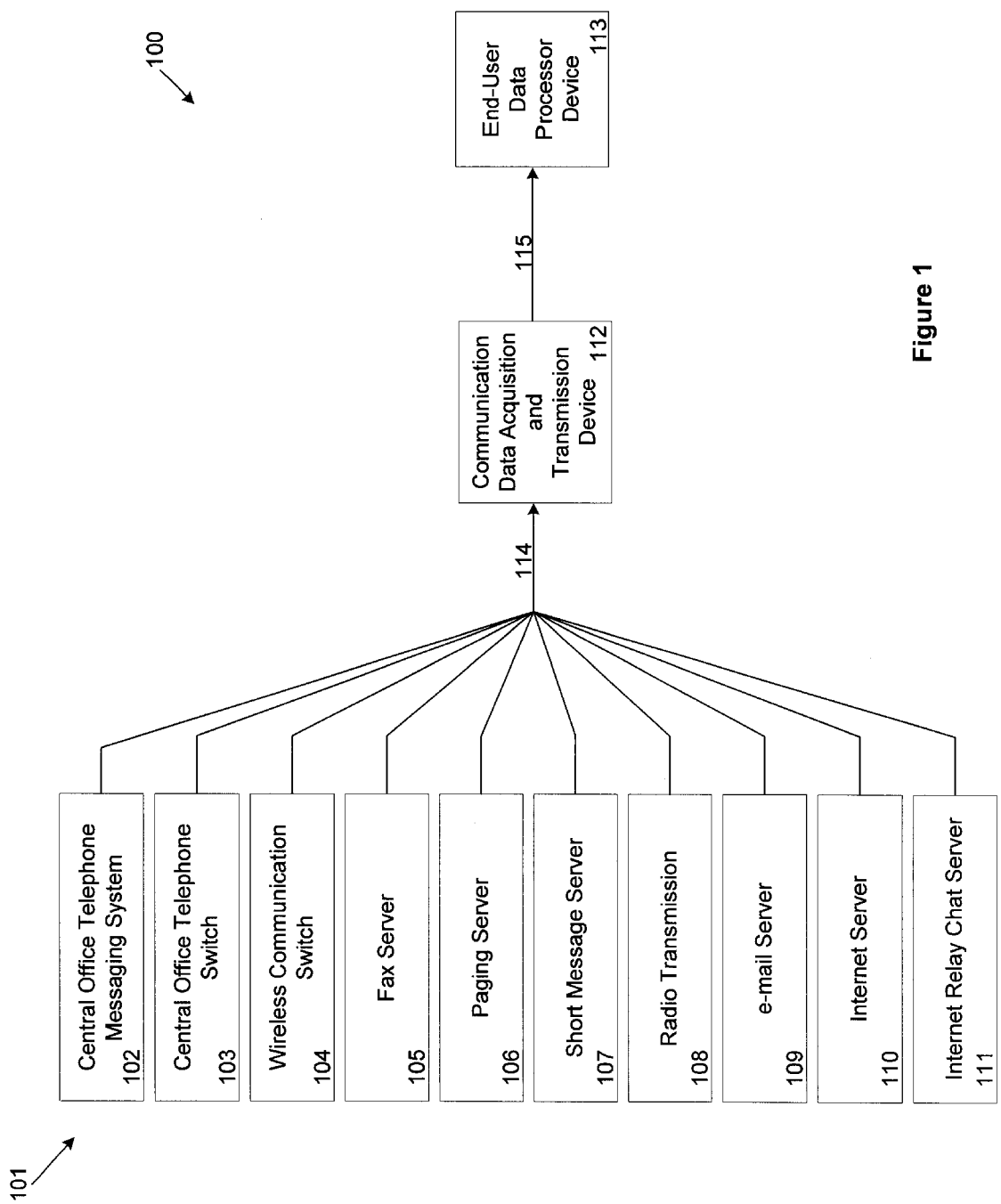
FIG. 1 is a block diagram of a network data messaging system according to the present invention.
Figure 3:
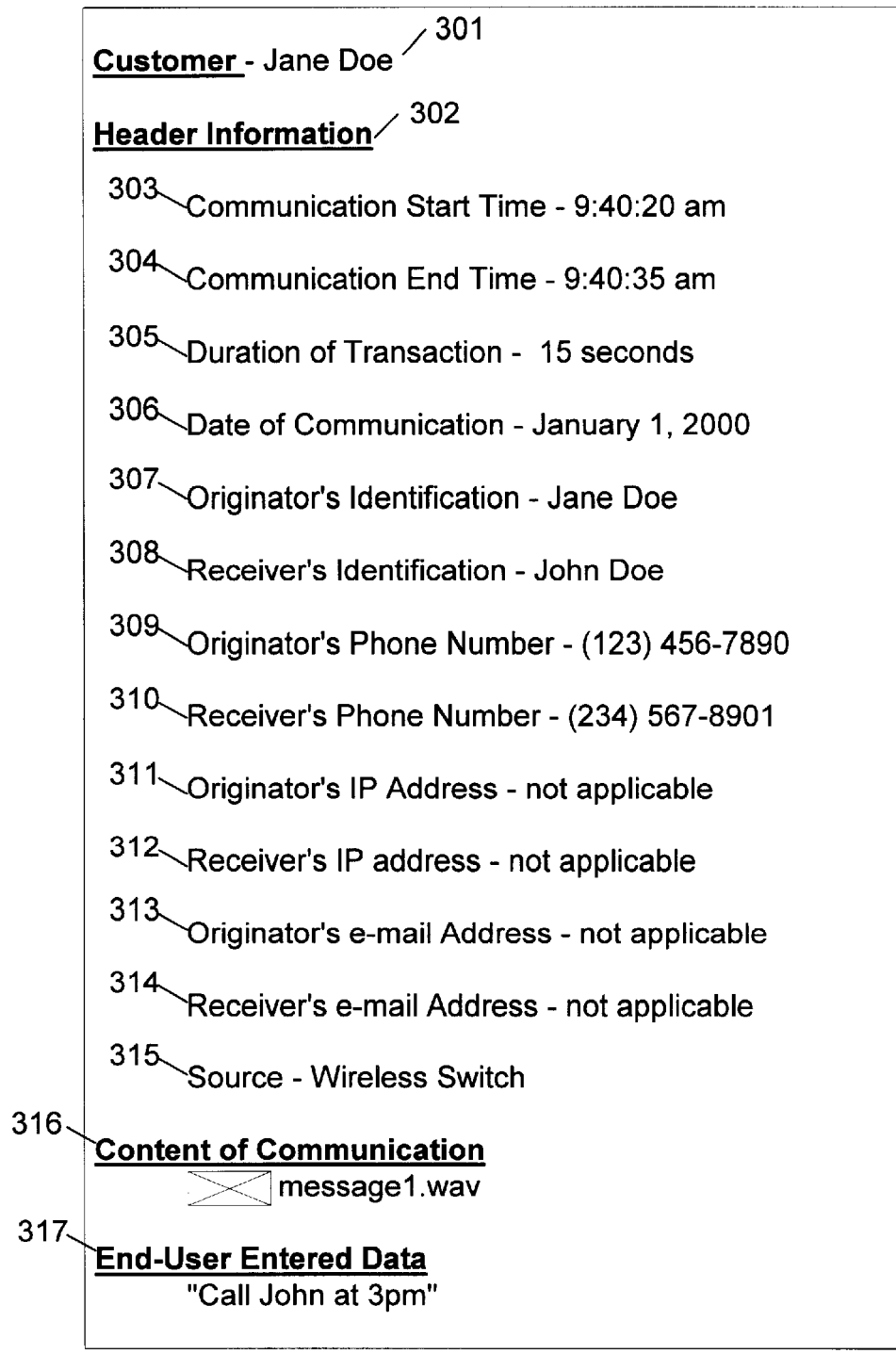
FIG. 3 is an exemplary illustration of communication data report provided to an end-user according to the present invention.
Figure 4:
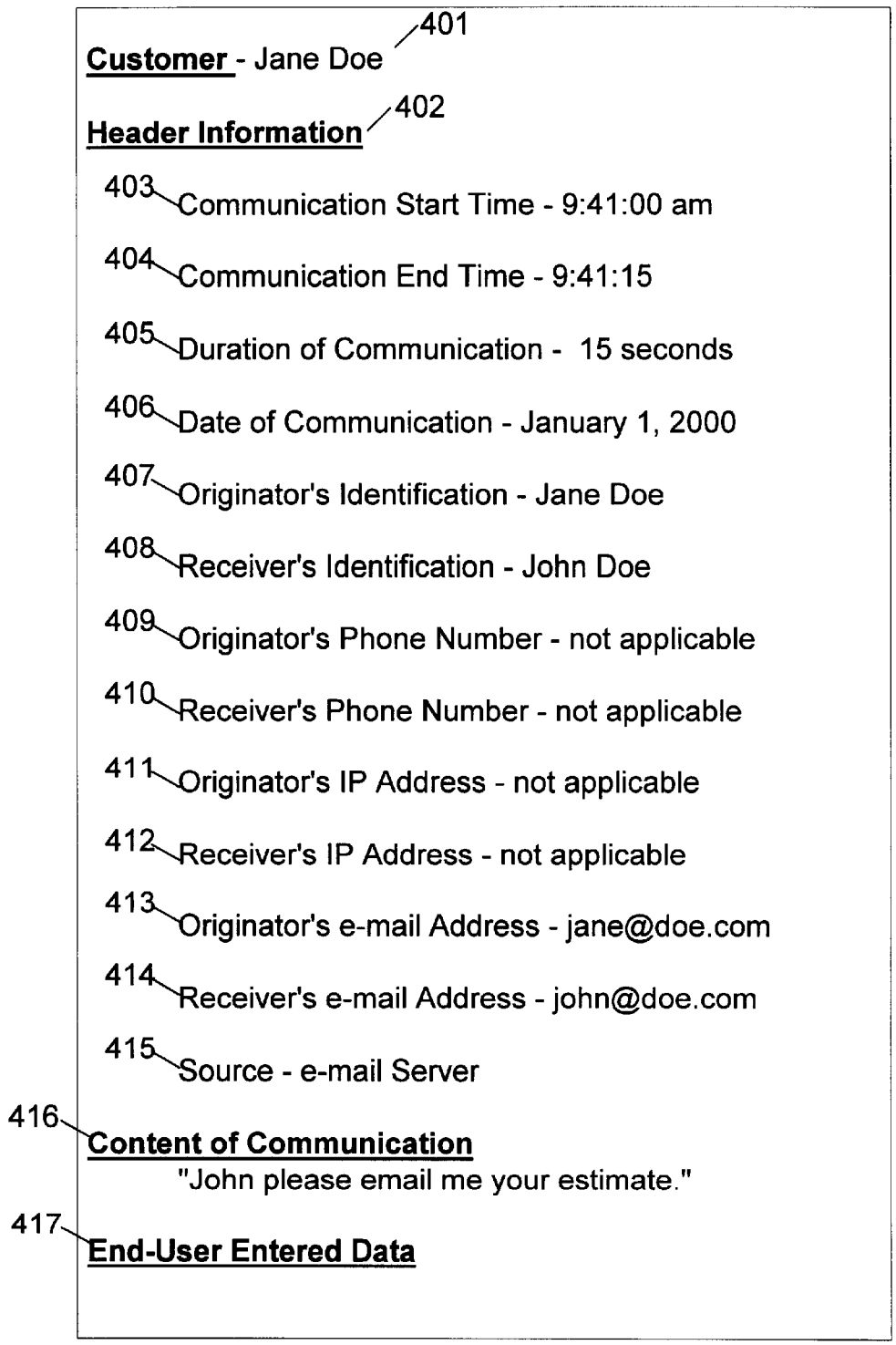
FIG. 4 is another exemplary illustration of communication data report provided to an end-user according to the present invention.

FIG. 1 is a block diagram of a network data messaging system 100 according to the present invention. Network data messaging system 100 comprises all available communications sources 101, including a central office telephone messaging system 102, central office telephone switch 103, wireless communication switch 104, fax server 105, paging server 106, short message server 107, radio transmission 108, e-mail server 109, Internet server 110, and Internet Relay Chat (IRC) server 111. Communication sources 101 provide communication data 114 (as shown in FIG. 5) to a communication data acquisition and transmission device 112 by wired or wireless methods. For example, wireless switch 104 and radio transmission 108 may communicate with communication data acquisition and transmission device 112 via wireless transmission, while fax server 105 and short message server 107 may be wired to communication data acquisition and transmission device 112. Communication data acquisition and transmission device 112 is in electrical communication with end-user data processor device 113, and may be located with a network communication provider or with an end-user customer of the network communication provider. End-user data processor device 113 receives communication data 115 from communication data acquisition and transmission device 112, and processes and displays data 115 in a format acceptable to the end-user (as shown in FIGS. 3 and 4). End-user data processor device 113 may, for example, be a desktop computer, a telephone, a hand-held communication device, or a printer.

Figure 2:
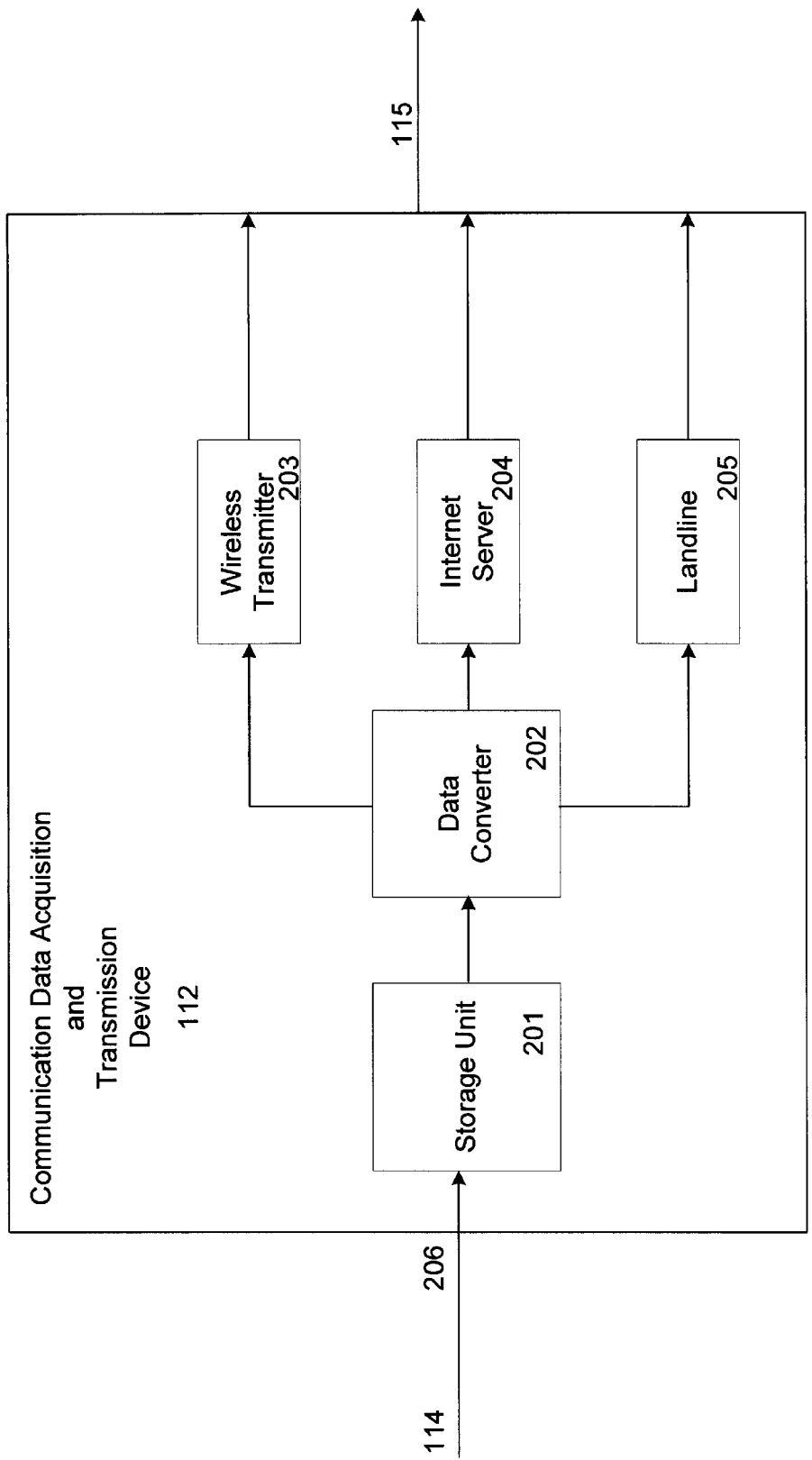
FIG. 2 is a block diagram of a communication data acquisition and transmission device according to the present invention.

FIG. 2 is a block diagram of communication data acquisition and transmission device 112 according to the present invention. Data 114 from all available communications sources 101 enters a port 206 of communication data acquisition and transmission device 112. Port 206 provides a path for the data to enter a storage unit 201. Storage unit 201 may comprise magnetic data storage devices, for example, those typically found in computer systems. Communication data acquisition and transmission device 112 may provide end-user data processor device 113 with data from available communications sources 101 by any available technique. For example, end-user data processor device 113 may receive data via a wireless transmitter 203, an Internet server 204, or a traditional landline 205, depending on the requirements of the end-user.

Communication data acquisition and transmission device 112 also may comprise a data converter 202. Data converter 202 translates the data from all available communications sources 101 into a format 115 useable by end-user data processor device 113. Data converter 202 may translate data 114 into a format 115 compatible with the end-user's existing computer software already available for billing or time verification purposes, for example ACT!™ software provided by Symantec Corporation. The precise formatting necessary may vary depending on the particular communication source. As shown in FIG. 2, data converter 202 may be a component of communication data acquisition and transmission device 112. Alternatively, data converter 202 may not be a part of communication data acquisition and transmission device 112. In this case, data conversion may be accomplished by end-user data processor device 113.

FIG. 3 is an exemplary illustration of communication data report 300 provided to an end-user according to the present invention. FIG. 4 is another exemplary illustration of communication data report 400 provided to an end-user according to the present invention. It should be appreciated that communication data reports 300 and 400 provide just one example of formatted data provided to a user, and that communication data reports 300 and 400 may take any number of forms and present any number of different types of information. As shown in FIGS. 3 and 4, communication data reports 300, 400 may be divided into four sections, customer information 301, 401, header information 302, 402, content of communication 316, 416, and end-user entered data 317, 417. Customer information 301, 401 provides information about a particular end-user, for example, the end-user's name. Header information 302, 402 comprises all other non-content information. For example, header information 302, 402 may include communication start time 303, 403, communication end time 304, 404, duration of communication 305, 405, date of communication 306, 406, originator's identification 307, 407, receiver's identification 308, 408, and type of source 315, 415. In addition, header information 302, 402 may comprise detailed information describing the nature of the communication. For example, as shown in FIG. 3, in the case of a traditional telephone communication (e.g., over fax server 105, wireless switch 104, or paging server 106), header information 302 may list originator's phone number 309 and receiver's phone number 310. Also, in the case of Internet communications (e.g., over Internet server 110 and Internet relay chat server 111), header information 302, 402 may list originator's IP address 311, 411 and a receiver's IP address 312, 412 (e.g., web page). As shown in FIG. 4, in the case of an e-mail communication, header information 402 may list originator's email address 413 and receiver's e-mail address 414.

Communication data reports 300, 400 may also comprise content of communication 316, 416. The form of the content will vary with the type of communication. For example, for voice-based communications, as shown in FIG. 3, content 316 may comprise a sound file that can be accessed by end-user data processor device 113. Alternatively, software may be implemented to convert voice-based communications into text. For text-based communications, like e-mail, as shown in FIG. 4, content 416 may comprise a text file. Communication data reports 300, 400 may provide an end-user with the ability of entering comments to reports 300, 400 at any time during the communication. For example, as shown in FIG. 3, after retrieving communication data report 300 an end-user may append a text message 317.

FIG. 5 provides a sample of data 114 that may be provided by available communications sources 101, for example a telephone. It is well known in the art that data 114 received from various communications systems often is standard ASCII text format. Data record 501 is a typical record of a telephone call made by a user. Although the record is not understandable by the user, the present invention will reformat the data into useable format for the user (as shown in FIGS. 3 and 4). The "N", "002" and "00", shown in data record 501 are codes used by communication technicians or administrators, and thus are not required for the user's report. Also, "A0000009 7.1.02.1" refers to certain hardware on the phone system, and thus are not required for the user. This unneeded information in data record 501 may be removed by communication data acquisition and transmission device 112 before transmitting data 115 to the user. The number "4999" represents the user's telephone number. In this example, the first six digits, representing the area code and office code, do not appear. However, communication data acquisition and transmission device 112 may add the area code and office code to report 300 and 400 (FIGS. 3 and 4) provided to the user. Field entry "06/99 10:26 00:00:20" represent the date, time and duration of the call and "8288144" is the number that the user dialed. Because it is a local call, the area code is not included. However, the area code may be added by the communication data acquisition and transmission device 112 to report 300 and 400 (FIGS. 3 and 4) provided to the user.

Data record 502 is a typical record of a telephone call received by a user. In this example, "801 555 5555" is the number from which the call was made to the user. Data record 502 also includes a calling line identification (CLID), in this example the user's name "John Doe," that identifies the party making the call. Although some of the information provided in FIGS. 3 and 4 are not shown in data records 501 and 502, this information may be added by data converter 202, for example. In addition, data converter 202 or end-user data processor device 113 may add the appropriate category headings.

Those skilled in the art will appreciate that numerous changes and modifications may be made to the preferred embodiments of the invention and that such changes and modifications may be made without departing from the spirit of the invention. For example, available communication sources 101 may include any available communication devices available to a user. In addition, the content and format of communication data reports 300 and 400 may include any information available to a user, organized in any desired format. It is therefore intended that the appended claims cover all such equivalent variations as fall within the true spirit and scope of the invention.

I claim:

1. A device for providing communication data to an end-user, said communication data comprising a first subset of call traffic information for communications made to said end-user and a second subset of call traffic information for communications made from said end-user, said device comprising:
   a storage unit for collecting said end-user's communication data for said first subset of call traffic information for communications made to said end-user from a plurality of sources;
   a storage unit for collecting said end-user's communication data for said second subset of call traffic information for communications made from said end-user from a plurality of sources; and
   a transmitter for transmitting said communication data, comprising said first subset of call traffic information for communications made to said end-user and said second subset of call traffic information for communications made from said end-user, from said plurality of sources to said end-user, said transmitter coupled to said storage unit.

2. The device of claim 1, further comprising a converter coupled to said storage unit for converting said communication data into a format useable by said end-user.

3. The device of claim 1, wherein said transmitter comprises a wireless transmitter.

4. The device of claim 1, wherein said transmitter comprises a wired transmitter.

5. The device of claim 1, wherein said storage unit comprises a wireless receiver for collecting said data.

6. The device of claim 1, wherein said storage unit comprises a wired receiver for collecting said data.

7. The device of claim 1, wherein said communication data comprises information about attempted communications.

8. The device of claim 1, wherein said communication data comprises information about completed communications.

9. A method for providing communication data to an end-user, said communication data comprising a first subset of call traffic information for communications made to said end-user and a second subset of call traffic information for communications made from said end-user, said method comprising the steps of:
   collecting said communication data for said first subset of call traffic information for communications made to said end-user from a plurality of sources;
   collecting said communication data for said second subset of call traffic information for communications made from said end-user from a plurality of sources; and
   transmitting said communication data, comprising said first subset of call traffic information for communications made to said end-user and said second subset of call traffic information for communications made from said end-user, to said end-user.

10. The method of claim 9, wherein said method further comprises converting said communication data into a format useable by said end-user.

11. The method of claim 9, wherein said communication data is collected from said plurality of sources using wired communication.

12. The method of claim 9, wherein said communication data is collected from said plurality of sources using wireless communication.

13. The method of claim 9, wherein said communication data is transmitted to said end-user using wired communication.

14. The method of claim 9, wherein said communication data is transmitted to said end-user using wireless communication.

15. The method of claim 9, further comprising selecting said end-user's communication data from each of said plurality of sources.

16. The method of claim 9, further comprising removing a portion of said communication data.

17. A system for providing communication data to an end user, said communication data comprising a first subset of call traffic information for communications made to said end-user and a second subset of call traffic information for communications made from said end-user, said system comprising:
   a plurality of sources that provide said communication data comprising said first subset of call traffic information for communications made to said end-user;
   a plurality of sources that provide said communication data comprising said second subset of call traffic information for communications made from said end-user;
   a storage unit for collecting said communication data, comprising said first subset of call traffic information for communications made to said end-user and said second subset of call traffic information for communications made from said end-user, wherein said storage unit is in electrical communication with said plurality of sources;
   a converter for converting said communication data into a format useable by said end-user, wherein said converter is coupled to said storage unit;
   a transmitter for transmitting said communication data, wherein said transmitter is coupled to said converter;
   a receiver for receiving said communication data, wherein said receiver is in electrical communication with said transmitter; and
   a display for displaying said communication data, wherein said display is coupled to said receiver.

18. The system of claim 17, wherein said transmitter is in wireless electrical communication with said receiver.

19. The system of claim 17, wherein said transmitter is wired to said receiver.

20. The system of claim 17, wherein said collector is in wireless communication with said plurality of sources.

21. The system of claim 17, wherein said collector is wired to said plurality of sources.

22. A data retrieval system that automatically provides time management reports to a plurality of end-users, wherein each time management report comprises information about communications made to and from a particular end-user, wherein said communication data comprises a first subset of call traffic information for communications made to said end-user and a second subset of call traffic information for communications made from said end-user, and wherein said communication data, comprising said first subset of call traffic information and said second subset of call traffic information, is gathered from a plurality of sources.

23. A data retrieval system as recited in claim 22, wherein said plurality of sources includes at least two members of the following group: central office messaging system, central office switch, wireless switch, fax server, paging server, short message server, radio transmission, e-mail server, Internet server, and Internet Relay Chat (IRC) server.

24. A data retrieval system as recited in claim 22, wherein said information comprises data sufficient to identify, for each communication involving a particular end-user, communication start time, communication end time, duration of communication, originator's name, receiver's name, originator's identification, receiver's identification, and source type.

25. A data retrieval system as recited in claim 24, wherein said receiver's identification and said originator's identification comprise calling line identification, telephone number, email address, and IP address.

26. A data retrieval system as recited in claim 22, wherein said time management information further comprises content of said communication.

27. A data retrieval system as recited in claim 22, wherein said information further comprises end-user entered data that is entered during or after said communication.

* * * * *